May 14, 1940.  V. S. BOND  2,200,532
BACTERIAL INOCULANT FOR LEGUMINOUS PLANTS
Filed Aug. 24, 1938

INVENTOR.
Varley Sherman Bond
BY Thiess, Olson & Mecklenburger
ATTORNEYS.

Patented May 14, 1940

2,200,532

UNITED STATES PATENT OFFICE 2,200,532

BACTERIAL INOCULANT FOR LEGUMINOUS PLANTS

Varley Sherman Bond, Quincy, Ill., assignor to Kalo Inoculant Company, Quincy, Ill., a corporation of Illinois Application August 24, 1938, Serial No. 226,565

14 Claims. (Cl. 71—7)

This invention relates to a bacterial culture and more specifically to a bacterial culture useful for the inoculation of the seeds of leguminous plants.

It is well known that certain plant species of the genus Leguminosae may under certain conditions fix nitrogen directly from the air and convert it to organic nitrogenous compounds. The mechanism of this nitrogen fixation is not understood at the present time, but it has been known for a number of years that it can only be carried out when the plant grows in symbiotic relationship with certain bacteria of the genus Rhizobia. Plants belonging to the genus Leguminosae which are capable of symbiotic relationship with the Rhizobia are peas, beans, alfalfa, red clover, white clover, vetch, lupines, and the like. The bacteria infect the roots of these plants in the soil and cause the formation of so-called nodules, in which it is presumed that the nitrogen fixation in the plant occurs.

Other plants that are important in agriculture, such as the grasses and grains, are not able to fix nitrogen from the air. They depend entirely upon the combined nitrogen in the soil, such as nitrates and ammonium salts, for their nitrogen requirements. Consequently, the combined nitrogen in the soil becomes depleted after a series of crops consisting only of the non-nitrogen fixers have been grown therein. It has consequently become customary in many districts to practice crop rotation, whereby the plants that are capable of fixing nitrogen in the soil will enrich the soil with combined nitrogen, whereby nitrogenous nutrients are provided for a succeeding crop of non-nitrogen fixing plants. More recently it has become the practice to plant mixed crops, which comprise a mixture of the nitrogen fixing and the non-nitrogen fixing variety. Nitrogen is thus supplied to the soil in a combined form which may be readily utilized by the non-nitrogen fixing plants.

Bacteria of the genus Rhizobia which are capable of infecting leguminous plants so that nitrogen may be fixed are widely spread in nature. They are not, however, universally present in soil and it has been found desirable to inoculate the seeds of leguminous plants with a culture of bacteria of the genus Rhizobia previous to the planting of the seeds in the field. This inoculation insures that micro-organisms of the correct species will be present in the soil whereby the leguminous plant may become infected. In the absence of such infection as pointed out above, no nitrogen fixation occurs within the plant.

The inoculation of seeds is particularly desirable where it is desired to plant them in a soil that has not grown a plant of the same species for a number of years. In order to insure a maximum amount of nitrogen fixation and development of the leguminous plant, it is always desirable to inoculate the seeds previous to the planting thereof.

Figure 1:
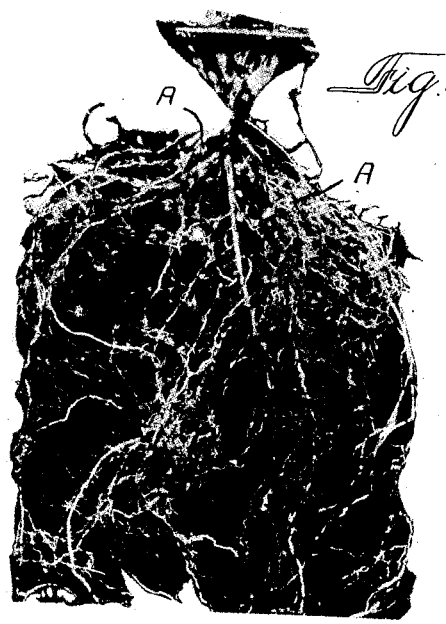
Figure 1 shows a root portion of a red clover plant bearing nodules A which were produced by infection with Rhizobium trifolii. This view was taken with permission of the authors from a photograph reproduced in the monograph Root Nodule Bacteria and Leguminous Plants, by Fred, Baldwin and McCoy, University of Wisconsin Studies in Science, No. 5, 1932.

It was discovered early that all species of the genus Rhizobia would not infect all of the plants of the genus Leguminosae to produce nodules wherein the nitrogen fixation presumably takes place. Thus certain species of bacteria are specific to certain species of Leguminosae. The group of plants that will be infected by a single species of bacteria has come to be known in the art as a cross-inoculation group. There are at least six well-recognized species of Rhizobium which will infect six fairly well-defined cross-inoculation groups of plants. Rhizobium meliloti will infect alfalfa and white or yellow sweet clovers; Rhizobium trifolii will infect red, white, crimson or mammoth clovers; Rhizobium leguminosarum will infect garden or field peas, vetch, and broad beans; Rhizobium phaseoli will infect garden or field beans; Rhizobium lupini will infect the lupines; and Rhizobium japonicum will infect the soy beans. The above groups are the most important in regard to inoculation of the seeds of field crops previous to sowing. There is a mixed group, including cow peas, lespedeza, peanuts, velvet beans, lima beans and crotalaria, which has not been well enough defined with respect to cross-inoculation to be assigned a definite terminology. This latter group, however, have been relatively unimportant for the preparation of commercial bacterial inoculants for the seeds of leguminous plants.

A number of so-called commercial cultures of bacteria have appeared on the market from time to time which were purported to be useful for producing nodulation of the roots of the leguminous plants. Many of these cultures have been very effective and useful for the purpose for which they were to be employed. These cultures have appeared in a large variety of forms and contain a large number of viable strains of the desired organism. They have been distributed on suitable jelly bottle slants or in a wet or dry carrying material such as sand, soil, or charcoal.

A variety of methods have also been employed for producing the bacterial inoculant for commercial distribution. In the preparation of an inoculant or culture in accordance with one method, the carrying media, such as humus or charcoal, may be inoculated with a suitable strain of the organism, and sugar, mineral salts, and water may be added with subsequent development of the species of organism therein. The resulting material is then packaged and distributed in any desired manner. This is known as the simple humus culture, but is not entirely satisfactory since it is usually desirable to at least partially sterilize the humus or other carrying material previous to inoculation with the Rhizobia culture in order to insure that the distributed organism will develop within the material to such an extent that a suitable number of organisms would be produced sufficient to inoculate the seeds to be treated. Furthermore, a large amount of metabolic products of the organims were formed directly in the culture, which do not provide a healthy environment for the organisms, and a large percentage have a tendency to die off in a relatively short time.

A second method that has been employed for the preparation of commercial inoculants has been to develop the organism in a liquid culture and, after the development of the organism in the liquid, mix the liquid with the desired amount of carrying material such as humus or charcoal. This method again has the disadvantage that the metabolic products of the organism and the residual sugars and protein of the culture medium are introduced directly into the commercial product as distributed, which tends to cause deterioration of the culture and the death of a large proportion of the organisms contained therein.

All of the cultures that have been successfully used in the past for the inoculation of the field leguminous plants, such as clover, alfalfa, soy beans, and the like, have contained only one species of the organism. Thus, for inoculation of soy beans, it has been the practice to use a bacterial inoculant comprising substantially a pure culture of *Rhizobium japonicum* in order to obtain maximum plant yield and maximum nitrogen fixation. The same is true with respect to the inoculation of the seeds of the plants belonging to the various other cross-inoculation groups which have been indicated above.

It has heretofore been considered impracticable to prepare a composite culture inoculant containing organisms which will cause nodulation on more than one of the cross-inoculation groups. This has not been done because it was generally believed that one species produced an inhibitory effect on another species within the same culture, whereby symbiotic nitrogen fixation by the plant and the organism was inhibited or even prevented. For this reason it has been considered desirable to use a culture containing a single species of organism rather than one containing a mixture.

The use of a single species of bacteria in a culture presents a serious difficulty in the manufacture and distribution of bacterial inoculants, since it is therefore necessary to distribute a separate culture contained in a separate package for the inoculation of seeds of plants belonging to the various cross-inoculation groups. This situation is further complicated by the fact that the cultures as distributed are ordinarily usable for only a certain length of time after preparation, since the organisms in the culture tend to die out on storage of the culture on the shelves of the distributor. It has consequently become the practice among the distribuors of bacterial inoculants of this character to replace cultures free of charge that are unused and over about one year old.

At the present time there are on the market many so-called "pasture mixtures" of seeds which comprise a mixture of seeds including those of different species of leguminous plants. There are distributed in comparatively small quantities, and heretofore the farmer seldom takes the trouble to inoculate the mixture with the several separate bacterial cultures necessary for the seeds of each cross-inoculation group in the pasture mixture.

One object of this invention is to provide a method for the preparation of an inoculant for the seeds of a leguminous plants which will contain a large number of micro-organisms and will retain their viability over a long period of time.

A further object of this invention is to provide a method for introducing a culture of bacteria into a suitable carrying material within which the inoculant is distributed.

A further object of this invention is to provide a mixed culture of Rhizobia capable of inoculating the seeds of plants belonging to several cross-inoculation groups and having the same efficiency in respect to nitrogen fixation as a culture which contains only a single species of the organism.

A further object of this invention is to provide a mixed culture the component strains of which are selected in such a manner that optimum efficiency results when the organisms are combined into a single culture.

A still further object of this invention is the provision of a bacterial culture prepared in admixture with a fine powdered inert material in a new and novel manner.

A further object of this invention is to provide an inoculant for the so-called "pasture mixture" which comprises efficient nitrogen fixing strains of different species of Rhizobia combined in one culture.

Further and additional objects of this invention will appear from the following detailed description, the drawing, and the appended claims.

In order to prepare an inoculant in accordance with one embodiment of this invention, the desired species of organism may be inoculated in any desired manner onto the surface of a suitable agar or jelly culture medium and allowed to grow for a period of several days. A quantity of water may then be added with thorough shaking and further growth permitted, after which time the resulting suspension may be incorporated with a suitable carrying medium such as humus, charcoal, soil, fine sand, and the like. The bacterial inoculant prepared in accordance with this general method contains an enormous number of organisms which will remain viable over a long period of time. The inoculant is easily handled and may be readily packed in cans or other containers for distribution to the farmer. If the carrying material employed is black humus or charcoal, the inoculant has a further advantage in that it may be readily determined whether or not it has been thoroughly mixed with the seeds previous to inoculation.

In order that this invention may be more readily understood, a specific example is presented in order to more definitely point out the method of preparation of the inoculant. A suitable and preferably pure culture of a bacterial species is selected. It may be obtained by direct isolation from the nodules of a leguminous plant according to methods that are well known in the art. Suitable methods are described by Fred, Baldwin and McCoy, supra, and in the Laboratory Manual of General Microbiology, by Fred and Waksman, 1928. The organism may be cultivated on a yeast extract-sucrose agar which may contain the following ingredients:

| | |
|---|---|
| Agar grams | 15.0 |
| Sucrose do | 10.0 |
| Dipotassium phosphate do | 0.5 |
| Magnesium sulfate do | 0.2 |
| Sodium chloride do | 0.1 |
| Calcium carbonate do | 1.0 |
| Calcium gluconate do | 1.5 |
| Yeast water (pH 6.8) cc | 50 |
| Tap water cc | 950 |

The yeast water infusion in the above formula may be prepared as suggested by Fred and Waksman, supra, page 16, as follows: Two kilograms of fresh starch-free pressed yeast are added to 10 liters of tap water. The mixture is steamed for three to four hours at 95° to 100° C. with occasional stirring. The resulting mass is sterilized in an autoclave in deep layers for a period of about one hour. The sterilized material is allowed to stand for about one week, and, if undisturbed, the yeast cells will settle to the bottom and leave a clear straw-colored liquid above. The clear infusion may then be siphoned off and the reaction adjusted to pH 6.8 to 7.0. This clear infusion is the yeast water referred to in the above formula.

The ingredients of the medium are mixed together and sterilized in the usual manner. The calcium carbonate may be sterilized separately and added to the sterile medium after it has cooled down in order to prevent the decomposition of sucrose during the heating period. The medium prepared in accordance with the formula given above is a jelly on the surface of which cultures of the Rhizobia may readily develop under aerobic conditions. It may be also prepared in the liquid form by eliminating the agar.

The desired culture of the Rhizobia may be inoculated onto an agar slant of the medium and incubated at suitable temperatures for a time to permit development of the culture on the surface of the agar. This first transfer of the culture is generally made in test tubes. After a suitable period of incubation, the culture may then be transferred by a sterile needle or loop from the test tubes to an agar slant in a 200 cc. flat bottle containing about 30 cc. of slanted agar media. Here the organism is again permitted to develop for a suitable incubation period at 28° to 30° C., which in most cases will extend from a few days to over a week. The culture grown on the agar surface of the bottle may then be aseptically washed from the surface with sterile water according to recognized bacteriological technique whereby a suspension of the organisms is produced. This suspension, being quite heavy and almost opaque, may be used for the inoculation of slanted agar media contained in a plurality of still larger bottles such as one liter bottles. These bottles may contain about 125 cc. of the agar medium described above. The inoculation may be made by streaking with a needle or aseptically spraying a water suspension of the organisms onto the surface of the agar by an atomizer or any suitable spraying means. It is desirable that aseptic conditions be maintained throughout the process until after the large bottles have been inoculated with a pure culture of the organism. Prevention of contamination up to this point is desirable, since the contaminating organism may outgrow the desired species of the Rhizobia, thus negativing the effect of the culture for seed inoculation purposes.

After the culture has developed on the surface of the agar in the large bottles for a suitable length of time (from about 2 to 10 days), tap water may be added in order to fill the bottles about half full. They are thoroughly agitated and the agar is cut or broken with a suitable metal probe, whereby the bacteria are rinsed from the surface of the agar and the agar becomes thoroughly broken up in the bottom of the bottle. It may be desirable, but it is not necessary, to employ sterile water for this purpose. The growth of the Rhizobia has taken place to such an extent that any chance contaminant will readily be suppressed by the large numbers of the Rhizobia.

After the agar has been thoroughly broken up, the large bottles are allowed to further incubate at suitable temperatures for a period of a few days. It has been found that the number of the organisms becomes very greatly increased during this subsequent period of incubation. The agar may then be separated from the suspension of organisms by passing the suspension through a suitable filter or screen. A four mesh screen has been found to be satisfactory. The bottles and agar may be washed with a small quantity of tap water. The resulting filtered suspension of bacteria is very heavy, being milk-like in appearance. This suspension may then be thoroughly incorporated with any desired amount of humus, which serves as a carrying means for the organism of the suspension. The humus and suspension mixture is allowed to stand for about 12 to 24 hours before the material is packed in order to permit complete absorption of the moisture by the humus. The resulting composition may then be packaged in moisture-proof fiber cans or other suitable containers for shipment.

The material from seventy-two one liter bottles inoculated and treated as described above is sufficient to inoculate about ninety kilograms of humus in order that the concentration of organisms in the humus will be approximately sixty million per gram. The final product may contain about 45% moisture. The water content may be adjusted by adding water in the desired proportions previous to packaging.

It will be understood, of course, that other types of media may be employed for the development of the organism preliminary to its inoculation into the humus or other carrying material, and the proportions of the various ingredients may be varied within a wide latitude. Likewise, charcoal, fine sand, soil, kieselguhr, and other materials may also be used as the carrying medium. If humus is employed, it may be desirable to neutralize its natural acidity with hydrated lime or calcium carbonate. It is not necessary, as has been previously stated, that sterile conditions be maintained after the incubation period on the surface of the agar immediately preliminary to the addition of the excess water. Sterile conditions are not necessary after this point, since the organisms have increased to such large numbers that they will suppress any type of contaminating organism that may be introduced. Likewise, it is not necessary to sterilize the humus or other carrying material because of the tremendous number of organisms of the desired type that are introduced therein. It will be readily recognized, however, that, if desired, strict aseptic conditions may be maintained up until the time the material is packaged in the containers for shipment.

The culture prepared in accordance with this method contains a sufficient number of organisms so that 150 grams will inoculate about one bushel of small seed.

It will be understood from the above description that the number of organisms incorporated into the humus may be readily predetermined by means of a Petroff-Hausser bacterial counter or other suitable direct counting apparatus. This method, therefore, has the advantage that the number of organisms being introduced into the final inoculant may be readily determined. The final culture is also comparatively free of excess sugar and minerals, since they are retained to a large extent by the agar in the large bottles. Consequently, additional nutrient is not introduced into the humus which may stimulate the development of contaminating organisms.

It will be understood also that the incubation period at the different stages of preparation of the culture previous to inoculating into the carrying means depends on many factors recognized by one skilled in the art. Thus, the character of the media, the temperature of incubation, and the species of Rhizobium are factors to be considered.

In order to inoculate the seeds of leguminous plants by the inoculant prepared in accordance with the above given description, the seed, within about twenty-four hours previous to the time of planting, is slightly moistened and a predetermined quantity of the inoculant is thoroughly mixed therewith in order to provide the desired concentration of organisms on the seed. The distribution of the inoculant throughout the seeds may be readily observed because of the black color of the humus with which the inoculant is prepared. The inoculant prepared in accordance with this invention may be satisfactorily used for a period of more than one year and sufficient organisms remain viable during this time in order to provide a number satisfactory for thorough inoculation.

As has been pointed out above, composite cultures for inoculating the seeds of leguminous plants have not generally come into use because of the inhibitory effect that certain strains of certain species of the Rhizobia have on each other and also because no method has been developed whereby a composite culture may be produced wherein a sufficient number of each species of organism in the inoculant is insured.

In order to more clearly point out the nature and magnitude of the inhibitory effect of several species of Rhizobia, tests were carried out using strains of various organisms which were picked at random and unselected in the manner to be hereinafter described. Thus a culture of *Rhizobium japonicum* which was known to be an efficient culture for fixing nitrogen when in association with the soybean plant was tested in order to determine its nitrogen fixing efficiency when inoculated onto soybean seeds in the presence of *Rhizobium trifolii* and *Rhizobium meliloti*. The tests were made by growing the appropriate plants in sterilized nitrogen-free sand according to well known methods in the art and fully set forth by Fred and Waksman, supra, and Fred, Baldwin and McCoy, supra. Three groups of soybean plants containing eight plants in each group were planted in a nitrogen-free sand containing suitable mineral salts and according to the standard methods. One group of seeds were planted sterile, being uninoculated. The seeds of the second group were inoculated with a single strain of the species of *Rhizobium japonicum* indicated above. The third group of seeds was inoculated with a mixture of the same strain of *Rhizobium japonicum* and strains of *Rhizobium trifolii* and *Rhizobium meliloti*. The seeds were permitted to germinate and the plants were grown in the sand for a period of fifty-six days. The eight plants developing from each group were then analyzed for total nitrogen by a suitable Kjeldahl procedure. The plants of the first group (uninoculated) contained a total of 79 milligrams of nitrogen. The plants of the second group (single strain) contained 246 milligrams of nitrogen. The plants of the third group (same strain mixed with strains of other species) contained only 203 milligrams of nitrogen. Consequently the plants of the second group fixed 167 milligrams of nitrogen over the control, and the plants of the third group only fixed 124 milligrams of nitrogen over the control. Thus it will be seen that this strain of *Rhizobium japonicum* produced 34.8% more nitrogen when employed alone than when employed in the presence of strains of other species of Rhizobia.

In the same manner a strain of *Rhizobium trifolii* which efficiently fixed nitrogen in the presence of the host plant alone was tested. Groups of forty plants were inoculated in this instance in the manner indicated above which is well recognized in the art. It was found that this unselected strain of *Rhizobium trifolii* caused about 118% more nitrogen to be fixed in the host plant when employed alone as an inoculant than when in the presence of other species of the Rhizobia, such as *Rhizobium japonicum* and *Rhizobium meliloti*.

It is possible, in accordance with one embodiment of this invention, to produce an effective composite inoculant containing a plurality of species of organisms which is capable of infecting a variety of leguminous plants belonging to a plurality of cross-inoculation groups.

In general, the composite culture may be prepared by selecting strains of the desired species of the Rhizobia which will produce optimum beneficial results to the host plant and will not be adversely affected by each other. The strains, after having been selected, may be cultivated in a manner which has been described above on agar or jelly media separately, the heavy suspension of each organism being introduced directly into the humus or other carrying material in the manner that has been previously described.

In order to produce a composite inoculant containing, for example, *Rhizobium meliloti*, *Rhizobium trifolii*, and *Rhizobium japonicum*, which inoculant will infect the corresponding cross-inoculation groups, a number of strains of each of these organisms may be isolated from nature by any of the approved methods such as have been described in the above referred to Laboratory Manual of General Microbiology by Fred and Waksman. Each of the strains are tested separately with its own host plant in order to select out those which are most effective in respect to the development of the host plant and the quantity of nitrogen fixed thereby. These tests may be made according to standard practice by aseptically growing the plants in a nitrogen-free substrata such as sand containing mineral salts. The cultures showing the best results in association with the host plant may then be selected and the various strains of the different species may be mixed together in order to determine if the nitrogen-fixing ability of one species is adversely affected by the mere presence of another, as has been previously thought to be the case. Thus, it has been previously considered that the nitrogen-fixing ability of *Rhizobium trifolii* in symbiotic relationship with red clover is markedly inhibited if strains of *Rhizobium meliloti*, *Rhizobium japonicum*, or other species of the Rhizobia were present within the same inoculant. It has been found, however, that, by a suitable process of selection of strains in the manner indicated above, a composite culture may be obtained which may be used to infect a plurality of cross-inoculation groups with optimum results.

The organisms of the genus Rhizobium which are mutually noninhibitive may be designated by the term alpha. No method has been observed whereby the alpha strains of the organisms may be differentiated from the mutually inhibitive group of Rhizobia other than by making actual nitrogen fixation tests by inoculating the various host plants with the proposed mixture of the Rhizobia. A composite culture that is satisfactory for use for inoculating seeds of alfalfa, red clover, and/or soy beans (representatives of three cross-inoculation groups) contains a mixture of *Rhizobium meliloti alpha*, *Rhizobium trifolii alpha*, and *Rhizobium japonicum alpha*. All of the strains may be selected so as to be mutually noninhibitive when mixed and used for seed inoculation. It will, of course, be recognized that certain inhibitive strains may be employed in the mixture. In general, however, it is desirable to use the alpha strains which have been selected in the manner proposed in the above. By the alpha strains, which have been designated herein, is meant those strains of the species of Rhizobia which are mutually noninhibitive of each other as regards nitrogen fixation in the host plant. It is understood that the alpha strains of each species may vary somewhat from each other in minor physiological, morphological and/or immunilogical characteristics. All such variants may be included within the scope of the term alpha strain.

One criterion by which the alpha strains of the organisms may be determined is based on a statistical comparison of the total milligrams of nitrogen fixed in plants previously inoculated with a single strain unmixed with strains of other species with the total milligrams fixed in plants inoculated with the same strain mixed with strains of other species. In making such tests the conditions for inoculation and growth of the plants should be kept uniform when testing both the mixed culture and the single strain. The method for carrying out tests for determining the amount of nitrogen fixed by leguminous plants in association with the various species of the Rhizobia are well known in the art and are given in detail by Fred and Waksman, supra, and Fred, Baldwin and McCoy, supra.

Each culture may be tested by inoculating a given number of seeds of the proper host plant with a strain of culture of bacteria to be tested either singly or mixed with other species of the Rhizobia. The seeds may then be planted in jars containing sterile sand and appropriate nitrogen-free mineral salt solutions capable of supporting plant growth. The same number of seeds are planted in each of five jars for each culture being tested, and the total number of milligrams of nitrogen fixed by the plants in each of the five jars is tested. The standard deviation of the mean amount of nitrogen fixed in each jar may then be determined by appropriate statistical methods. If the mean plus or minus the standard deviation of the nitrogen content of plants inoculated with a strain used unmixed with the strains of another species, overlaps the mean plus or minus the standard deviation of plants inoculated with the same strain used mixed with other species of Rhizobia, that strain may be considered as nonantagonistic or an alpha strain within the meaning of this invention.

For the preparation of a composite bacterial inoculant in accordance with this invention, heavy suspensions of selected cultures of *Rhizobium trifolii alpha*, *Rhizobium meliloti alpha*, and *Rhizobium japonicum alpha* may be prepared in the same manner as has been indicated above for the preparation of a single culture in accordance with this invention. The heavy suspensions may then be mixed and introduced into the humus in concentrations suitable to give the desired results.

In order that 90 kilograms of dry humus may be properly inoculated with the three organisms indicated above, about 19 liters are prepared of each suspension in the manner previously indicated. The concentration of organisms in the suspension may be about 300 million per cubic centimeter for *Rhizobium meliloti alpha* and *Rhizobium trifolii alpha* and about 450 million per cubic centimeter for *Rhizobium japonicum alpha*. The suspensions may be introduced into the humus or other carrying material separately or may be mixed before introduction. The humus, after inoculation with the three organisms (about 57 liters of composite suspension), may be passed through a suitable mechanical mixer in order to thoroughly incorporate the organisms within the humus or carrying material. The water content of the humus may be brought up to about 45% and the mass is permitted to stand for about 12 to 24 hours preliminary to packaging in order to permit a more thorough absorption of the water and bacterial cultures into the humus. This latter storage period also causes the humus to become lighter and more easily handled by the packing machines, which may be of any desired kind. One hundred seventy-five grams of this inoculant is sufficient to inoculate one bushel of red clover or alfalfa seed or two bushels of soy bean seed.

The resulting composite inoculant may be used for inoculating the seeds of leguminous plants in the same manner as hereinbefore set forth. It may be used with good results for inoculating the seeds of any of the plants included within the cross-inoculation groups represented by the bacterial species present. The particular example given has included Rhizobium trifolii alpha, since it has been generally thought that Rhizobium trifolii was particularly sensitive to other of the Rhizobia in respect to its ability to fix nitrogen within the host plant. It has been found, however, that, by suitable selecting, strains of the organism may be found from which a composite inoculant may be produced having all of the desirable qualities of a single strain culture with the further additional advantages previously indicated.

It will be understood that this invention is not to be limited to the above described method for producing a composite inoculant. It is not necessary that it be prepared as set forth in the manner described above. Any inoculant comprising a mixture of selected anti-inhibitive strains of ordinarily inhibitive organisms of the Rhizobia group is included within the spirit and scope of this invention.

In order that a more definite understanding may be had of the advantages to be derived from the use of a composite culture selected and prepared in accordance with this invention, a series of tests were made by planting red clover seeds in half gallon jars containing sterile sand supplemented with all essential minerals except nitrogen, and were inoculated as indicated below. After ten weeks of growth in the greenhouse under identical conditions, the sand was washed from the roots of the plants, the plants dried, weighed and ground and samples were analyzed by the Kjeldahl method for their nitrogen content.

Each group or series of seeds was planted in a series of five jars and the standard deviation between the jars of each culture series was determined. Each series was inoculated as follows:

1. Uninoculated control plants.
2. Plants inoculated with a non-selected strain of Rhizobium trifolii in single culture unmixed with other species.
3. Plants inoculated with a selected, non-antagonistic strain of Rhizobium trifolii alpha in single culture unmixed with other species.
4. Plants inoculated with same organism as series 2 in admixture with other species of the Rhizobia.
5. Plants inoculated with the same organism as series 3 in admixture with other species of Rhizobia.

The following table is presented which indicates the inoculant used for each series of plants, the dry weight of ten plants, the per cent of nitrogen in the dry material, the milligrams of nitrogen present per ten plants, and the milligrams of nitrogen fixed per ten plants:

| Inoculant series No. | Grams dry weight per 10 plants | Percent nitrogen | Mg. nitrogen per 10 plants | Mg. nitrogen fixed per 10 plants |
| --- | --- | --- | --- | --- |
| 1 | 0.61 | 1.07 | 6.5± 0.8* | |
| 2 | 4.18 | 2.92 | 122.0±10.8* | 115.5±10.0* |
| 3 | 4.60 | 2.85 | 131.0±16.6* | 124.5±15.8* |
| 4 | 3.53 | 2.29 | 80.8± 4.7* | 72.3± 3.9* |
| 5 | 4.50 | 2.83 | 126.0±40.5* | 119.5±39.7* |

*Standard deviation of the mean of a series of 5 jars.

It will be observed that the nitrogen fixing efficiency of the inoculants of series 2, 3 and 5 are high and substantially the same. When the non-selected strain, however, was mixed with other species of Rhizobia the amount of nitrogen fixed by the host plant was seriously impaired as indicated by series 4. This example clearly shows the increase in effectiveness of a mixed culture which contains an alpha strain over that which contains a non-selected but otherwise efficiently nitrogen fixing strain. It is pointed out here that the mean plus or minus the standard deviation of the nitrogen fixed by series 4 does not fall in the same range as the mean plus or minus the standard deviation of that fixed by series 2. Series 3 and 5 do overlap in this respect and the strain of Rhizobium trifolii employed in those tests was consequently an alpha strain according to the one criterion that has been previously described.

It is to be understood that this invention is not to be limited to the selection of a single strain which is to be used in the composite culture. All of the strains may be selected in the manner indicated previous to the preparation of the inoculant. Furthermore, if desired, a plurality of strains of the same species may be introduced into the composite culture containing several species. This practice has been found to be desirable in many instances in order that there will be double insurance that an effective nitrogen fixing strain of the specific organism is present within the culture.

Referring more particularly to the drawing, Fig. 1 is a photolithograph picture of a root system of a red clover plant having nodules A located near the crown of the root. Large nodules on the plant near the crown are indicative of good nitrogen fixation and a good strain of the organism.

Figure 2:
Fig. 2 shows a group of forty red clover plants after ten weeks' development in a sterile nitrogen-free sand culture which was not inoculated previous to the time of planting.

Fig. 2 shows a control group of forty red clover plants which have grown in a nitrogen-free sand culture for ten weeks with no Rhizobia present. This group had a wet weight of 20.4 grams and total nitrogen content of 27 milligrams derived from the original seeds. No nitrogen was fixed.

Figure 3:
Fig. 3 shows a group of forty-one red clover plants of the same age and number grown in the same nitrogen-free substrata as those in Fig. 2, but wherein the seeds were inoculated with a culture of Rhizobium trifolii previous to planting.

Fig. 3 shows the forty-one plants grown under identical conditions as those shown in Fig. 2 but which were inoculated with a humus inoculant containing only bacteria of the species Rhizobium trifolii alpha prepared in accordance with this invention. The wet weight of this group of plants was 156.7 grams and had a total nitrogen content of 645 milligrams of nitrogen. Thus 618 milligrams of nitrogen were fixed.

Figure 4:
Fig. 4 is the same as Fig. 3 but wherein the seeds were inoculated with a composite culture prepared in accordance with one embodiment of this invention.

Fig. 4 shows a group of forty plants the same as Fig. 3 which were inoculated with a composite inoculant prepared in accordance with one embodiment of this invention containing strains of the species Rhizobium trifolii alpha, Rhizobium meliloti alpha, and Rhizobium japonicum alpha. It will be noted that the red clover plants inoculated with the composite inoculant containing the alpha strains are fully developed to the same extent as the one inoculated with the pure culture and no inhibition is observed in the plant development because of the presence of the other organisms. The wet weight of this group was 159.0 grams and had a total nitrogen content of 662 milligrams. Thus 635 milligrams of nitrogen were fixed.

It will be observed that the organisms of the composite culture described in the foregoing example may be introduced into the culture in any desired numbers and the relative proportion may be fairly accurately predetermined by means of direct bacterial count. The cultures are not mixed until immediately preliminary to their introduction into the carrying material and after they have developed to substantially their maximum numbers. Consequently, there is no danger of one species overgrowing the other during the process of incubation.

The invention is not to be limited in any way to the number of organisms contained within the inoculant or the number necessary for inoculating a predetermined quantity of seed. In practice, and as shown herein, a large excess of bacteria is generally introduced into the carrying material in order to insure that all of the seeds are thoroughly inoculated with a sufficient number of organisms to produce the desired results.

While several particular embodiments of this invention are shown above, it will be understood, of course, that the invention is not to be limited thereto since many modifications may be made, and it is contemplated, therefore, by the appended claims to cover any such modifications as fall within the true spirit and scope of this invention.

I claim:

1. An inoculant for leguminous plants comprising a plurality of selected cultures of different species of bacteria of the genus Rhizobium, one of said cultures being *Rhizobium trifolii alpha*, said cultures being substantially unaffected by each other in respect to their ability to fix nitrogen in the leguminous plant for which they are specific.

2. A bacterial inoculant for leguminous plants comprising a plurality of strains of different species of bacteria of the genus Rhizobium comprising *Rhizobium trifolii alpha, Rhizobium meliloti alpha*, and *Rhizobium japonicum alpha*.

3. An inoculant for leguminous plants comprising humus and a mixture of species of bacteria of the genus Rhizobium, said mixture containing a strain of *Rhizobium trifolii alpha*.

4. An inoculant for leguminous plants comprising a plurality of selected mutually non-inhibitive strains of different species of bacteria of the genus Rhizobium, said strains being unaffected by each other in respect to their ability to fix nitrogen in the leguminous plant for which they are specific.

5. An inoculant for leguminous plants comprising a plurality of strains of different species of bacteria of the genus Rhizobium, at least one of which strains is unaffected by the others in respect to its ability to fix nitrogen in the leguminous plant for which it is specific.

6. An inoculant for leguminous plants comprising a plurality of strains of different species of bacteria of the genus Rhizobium, the bacteria of each strain being present in numbers of substantially the same order of magnitude, said strains being substantially unaffected by each other in respect to their ability to fix nitrogen in the leguminous plant for which they are specific.

7. A bacterial inoculant for leguminous plants comprising a moist powder base and a plurality of selected mutually non-inhibitive strains of different species of bacteria of the genus Rhizobium including *Rhizobium trifolii*, the bacteria of each strain being present in numbers of substantially the same order of magnitude, said strains being substantially unaffected by each other in respect to their ability to fix nitrogen in the leguminous plant for which they are specific.

8. A bacterial inoculant for leguminous plants comprising a moist powder base containing a substantially negligible concentration of bacterial nutrients and a plurality of strains of different species of bacteria of the genus Rhizobium, at least one of which strains is unaffected by the others in respect to its ability to fix nitrogen in the leguminous plant for which it is specific.

9. A method for producing a bacterial inoculant for leguminous plants which comprises separately selecting strains of different species of the genus Rhizobium, separately cultivating said strains in nutrient media, and mixing the resulting cultures whereby a composite inoculant is produced, said strains originally being selected so that they are substantially non-inhibitive and non-antagonistic to each other in respect to their ability to fix nitrogen in the host plant for which they are specific.

10. A method for producing a composite inoculant for leguminous plants comprising a plurality of strains of different species of bacteria of the genus Rhizobium, which comprises cultivating each strain separately in suitable culture medium to produce a substantial quantity of living organisms and thereafter mixing the organisms with a moist powder base containing a substantially negligible concentration of bacterial nutrients whereby the desired inoculant is formed.

11. A method for producing a composite bacterial inoculant for leguminous plants which comprises separately cultivating a plurality of strains of bacteria selected from different species of the genus Rhizobium and subsequently mixing the resulting cultures containing large numbers of bacteria with a moist powder base containing a substantially negligible concentration of bacterial nutrients whereby the desired inoculant is obtained, the bacteria of each strain being present in numbers of substantially the same order of magnitude.

12. A method for producing a composite inoculant for leguminous plants which comprises separately cultivating a plurality of species of bacteria of the genus Rhizobium in separate cultures and mixing with a powder base predetermined numbers of the bacteria of each culture to produce the desired inoculant, said powder base being substantially free of added bacterial nutrients.

13. A bacterial inoculant for leguminous plants comprising a plurality of strains of different species of bacteria of the genus Rhizobium in numbers of substantially the same order of magnitude incorporated with a powder base, the mixture being substantially free of bacterial nutrients whereby growth of the bacteria therein is inhibited.

14. The inoculant as defined in claim 13 wherein one of said species is *Rhizobium trifolii*.

VARLEY SHERMAN BOND.

Disclaimer 2,200,532.—*Varley Sherman Bond*, Quincy, Ill. BACTERIAL INOCULANT FOR LEGUMINOUS PLANTS. Patent dated May 14, 1940. Disclaimer filed July 27, 1948, by the assignee, *Kalo Inoculant Company*.

Hereby enters this disclaimer to claims 1 to 8 inclusive and claims 13 and 14 of said patent.

[*Official Gazette August 31, 1948.*]